(12) United States Patent
Guerra Delgado et al.

(10) Patent No.: US 11,010,334 B2
(45) Date of Patent: May 18, 2021

(54) OPTIMAL SNAPSHOT DELETION

(71) Applicant: VMware, Inc., Palo Alto, CA (US)

(72) Inventors: Jorge Guerra Delgado, Fremont, CA (US); Richard P. Spillane, Mountain View, CA (US); Kapil Chowksey, Cupertino, CA (US); Sandeep Rangaswamy, Mountain View, CA (US); Abhishek Gupta, Sunnyvale, CA (US); Srinath Premachandran, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 641 days.

(21) Appl. No.: 15/947,072

(22) Filed: Apr. 6, 2018

(65) Prior Publication Data

US 2019/0311047 A1 Oct. 10, 2019

(51) Int. Cl.
*G06F 16/11* (2019.01)
*G06F 9/455* (2018.01)
*G06F 16/188* (2019.01)
*G06F 16/22* (2019.01)
*G06F 16/23* (2019.01)

(52) U.S. Cl.
CPC ........ *G06F 16/128* (2019.01); *G06F 9/45558* (2013.01); *G06F 16/188* (2019.01); *G06F 16/2246* (2019.01); *G06F 16/2358* (2019.01)

(58) Field of Classification Search
CPC .. G06F 16/128; G06F 16/188; G06F 16/2246; G06F 16/2358; G06F 9/45558

USPC ......................................................... 707/649
See application file for complete search history.

(56) References Cited

U.S. PATENT DOCUMENTS

| 8,849,876 B2* | 9/2014 | Wang ..................... G06F 16/128 |
| | | 707/814 |
| 2015/0081993 A1* | 3/2015 | Christopher ........ G06F 11/1451 |
| | | 711/162 |
| 2019/0065508 A1* | 2/2019 | Guturi ................. G06F 16/9027 |

\* cited by examiner

*Primary Examiner* — Kimberly L Wilson
(74) *Attorney, Agent, or Firm* — Patterson + Sheridan, LLP

(57) ABSTRACT

Embodiments described herein involve improved management of snapshots of a file system. Embodiments include copying a first root node of a first snapshot to a second snapshot, the second snapshot referencing other nodes of the first snapshot. Embodiments further include incrementing reference counts of the other nodes of the first snapshot. Embodiments further include adding a storage address of the first root node to a list. Embodiments further include, each time that a copy on write operation is performed for a node of the other nodes, adding a storage address of the node to the list and decrementing the reference count of the node. Embodiments further include iterating through the list and, for each storage address in the list, decrementing the reference count of the node corresponding to the storage address and, if the reference count of the node reaches zero, freeing storage space at the storage address.

21 Claims, 6 Drawing Sheets

OPTIMAL SNAPSHOT DELETION

BACKGROUND

Logical storage systems (e.g., file systems, such as virtual disks, backed by physical storage devices) may support the creation and management of file snapshots, wherein users are enabled to create snapshots (e.g., checkpoints for backup/recovery purposes) of the state of data stored in the logical storage system at the time the snapshot is created. A snapshot, accordingly, may be considered a copy of the data stored in the logical storage system at a certain time. Snapshots are sometimes associated with logs that store ongoing IO operations that take place in the logical storage system so that the state of the data in the logical storage system can be fully recreated from the snapshot by "replaying" the IO operations from the log in the event of a failure (e.g., a hardware or software crash, file corruption, loss of connectivity, or the like). For example, IO operations that occur after the time the snapshot was created may be stored in the log, and in the event of a failure, the data in the logical storage system can be recreated by starting from the snapshot and replaying the IO operations from the log on the data in the snapshot.

In some cases, when a log associated with a first snapshot is full (or almost full, as determined based on a size threshold), a second snapshot with a new log may be created to capture an updated state of the logical storage system. A second snapshot may, for example, be created by copying the first snapshot and replaying the log of the first snapshot in order to capture an updated state of the data in the second snapshot. Copy on write (COW) techniques are often used when creating additional snapshots (e.g., the second snapshot), such that nodes (e.g., data blocks) of the first snapshot are only copied to the second snapshot when the nodes are modified (e.g., when a write operation is performed on the node, such as based on an IO operation replayed from the log).

In some cases, snapshots are deleted. For example, the first snapshot may be deleted after the second snapshot has reached a consistency point (e.g., when the second snapshot represents the complete state of the data at the time the second snapshot was taken, such as when the log of the first snapshot has been fully replayed). In such cases, deleting the first snapshot may be inefficient. For example, a delete operation may involve traversing the entire file structure of the first snapshot to determine which nodes in the snapshot have been copied (e.g., using COW) to the second snapshot and can therefore be deleted, as opposed to nodes which are still referenced by the second snapshot (e.g., nodes for which COW has not yet been performed because the nodes have not yet been modified), and may therefore not yet be deleted. Accordingly, there is a need in the art for improved methods of deleting snapshots.

DETAILED DESCRIPTION

Figure 1:
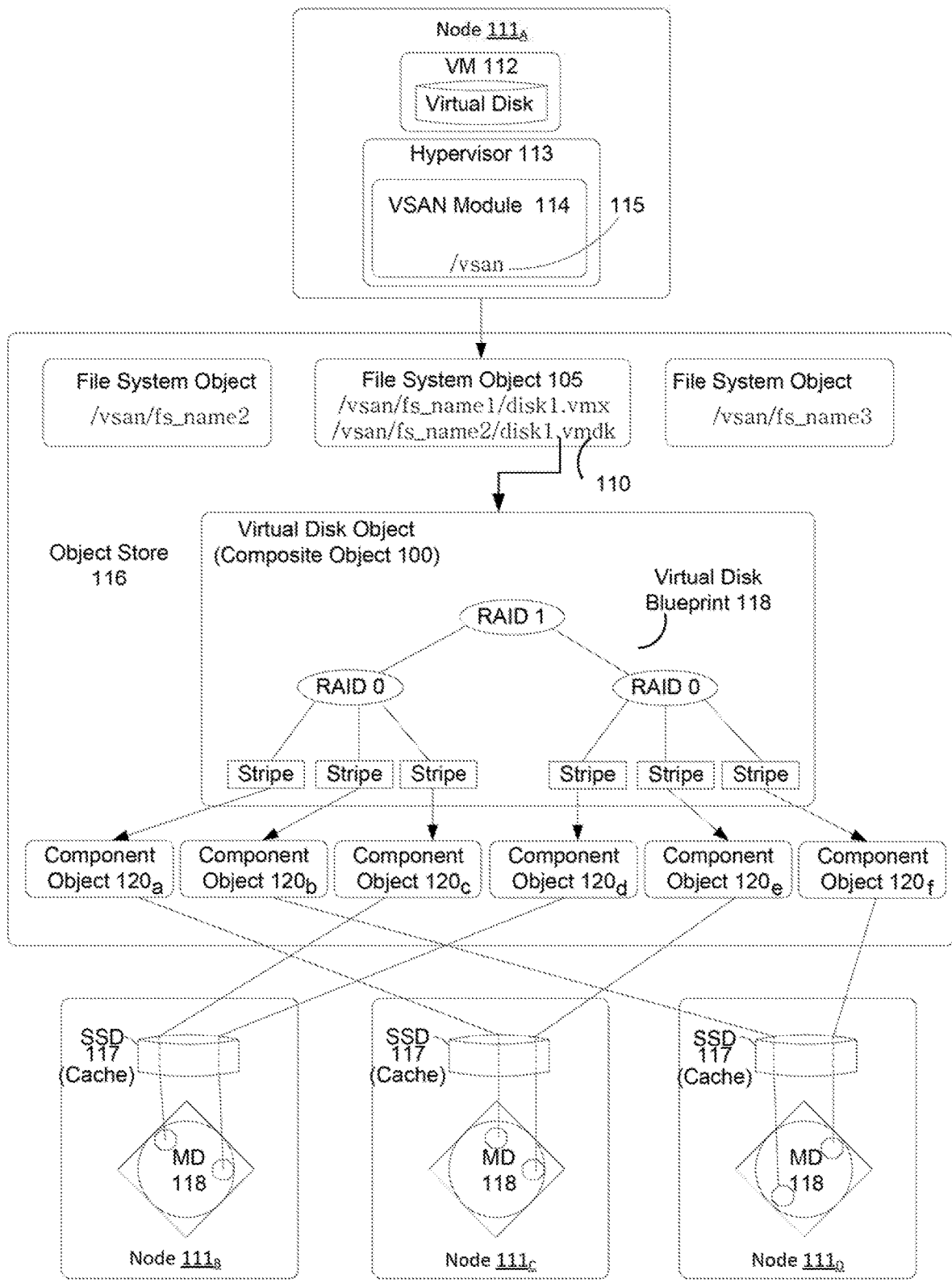
FIG. 1 depicts an example hierarchical structure of storage objects that represent a logical storage system for which embodiments of the present disclosure may be implemented.

The following description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

Embodiments of the present disclosure relate to managing snapshots of a logical storage system, such as a file system of a virtual storage area network (VSAN). In particular, embodiments relate to optimizing deletion of snapshots on logical storage systems.

In one embodiment, a first snapshot of a logical storage system may be created, the first snapshot comprising a plurality of nodes (e.g., data blocks) that represent the state of data of the logical storage system at the time the first snapshot is created. For example, the first snapshot may comprise all memory sectors, pages, blocks, or units, and indices and addresses allocated to the logical storage system, the contents of all physical or virtualized hardware registers, the settings for all drivers and peripherals, and the like, that are stored in any storage device associated with the logical storage system and that are necessary and sufficient that, when loaded into the physical system in the proper locations, cause the logical storage system to proceed with processing in an identical manner. The first snapshot may comprise a tree-based data structure, such as a B-tree. After the first snapshot is created, subsequent IO operations (e.g., data write operations) may, in some embodiments, be written to a log associated with the first snapshot. The log may keep track of changes that have been made to the state of the data (e.g., in the form of IO operations) in the logical storage system since the first snapshot was created, instead of creating entire snapshots to capture subsequent changes.

At some point after the first snapshot is created, a second snapshot may be created. For example, the second snapshot may be created when the log associated with the first snapshot is full or nearly full (e.g., the size of the log may be compared to a threshold and, if the size reaches or exceeds the threshold, a new snapshot may be created). In another embodiment, a user may initiate creating the second snapshot. A copy on write (COW) technique may be used to copy the first snapshot to the second snapshot. For example, the root node of the first snapshot may be copied in order to create a root node of the second snapshot, and the root node of the second snapshot may initially contains references to all other nodes of the first snapshot (e.g., the other nodes are not copied to the second snapshot until such time as they are written to or modified). Accordingly, both the root node of the first snapshot and the root node of the second snapshot may both initially point to the same nodes. The second snapshot may also comprise a tree-based data structure, such as a B-tree.

A data structure (e.g., table, list, or the like) may be maintained (e.g., by a management entity associated with the logical storage system) that stores a reference count in association with each of the nodes in both snapshots, such that when a reference is added from the second snapshot to a particular node of the other nodes in the first snapshot (e.g., after the second snapshot is created and before a COW is performed to copy the particular node to the second snapshot), the reference count for the particular node is incremented by one. Therefore, if a particular node of the first snapshot is referenced both by the first snapshot and by the second snapshot, the particular node will be associated in the data structure with a reference count of two. Further, a particular node of the first snapshot referenced by the first snapshot and not the second snapshot would be associated in the data structure with a reference count of one.

The second snapshot may, in some embodiments, be updated based on the log associated with the first snapshot, such as by "replaying" the IO operations stored in the log and updating the state of the data at the second snapshot accordingly. Whenever a COW is performed to copy a particular node from the first snapshot to the second snapshot (e.g., based on an IO operation replayed from the log associated with the first snapshot modifying data of the particular node (e.g., writing to the particular node)), the reference count of the particular node is reduced by one (e.g., because the particular node is no longer referenced by the second snapshot, but has instead been copied to the second snapshot, and is now only referenced by the first snapshot). The second snapshot may, in some instances, maintain a log of all IO operations that take place in the logical storage system after the time that the second snapshot is created.

Eventually, a determination may be made to delete the first snapshot. For example, when the second snapshot reaches a "consistency point" such that the second snapshot reflects the entire state of the data at the time that the second snapshot was created (e.g., when all IO operations from the log associated with the first snapshot have been replayed into the second snapshot), the first snapshot may be considered obsolete, and may be deleted to free storage space. Because some nodes of the first snapshot may still be referenced by other snapshots (e.g., the second snapshot and/or any other subsequent snapshots that may have been created), all nodes of the first snapshot may not simply be deleted. While the data structure comprising the reference count of each node could be used to determine which nodes to delete, this may be inefficient, as the entire data structure would need to be traversed. In large storage systems, this may require a significant amount of processing resources. As such, embodiments of the present disclosure involve maintaining a separate list of all nodes that have been copied (e.g., using COW techniques) from the first snapshot.

In certain embodiments, each time a COW is performed to copy a node from the first snapshot to the second snapshot, an address (e.g., of a storage location) of the node is added to a list. The list may, for example, be any type of data structure that supports adding, removing, and iterating of items, such as an array, vector, tree, etc., and may be maintained by a management entity associated with the logical storage system. For instance, when the root node of the first snapshot is copied to the second snapshot, the address of the root node is added to the list. Subsequently, the address of each node that is copied from the first snapshot to the second snapshot (e.g., using COW when the node is modified, at which time the reference count of the node is decreased by one) is also added to the list.

When it is determined that the first snapshot is to be deleted, the list may be used to perform an optimized delete operation without requiring traversal of the entire data structure comprising the reference counts of all nodes. For example, an optimized delete operation may involve iterating through the list and, for each address in the list, decreasing the reference count (e.g., in the data structure) of the node associated with the address by one. When the reference count of a node reaches zero, the storage space occupied by the node (e.g., at the address in the list) is freed (e.g., marked as free so that it may be used for other purposes). The reference counts of all nodes associated with addresses in the list will generally reach zero when this technique is performed, and the storage space occupied by all nodes with addresses in the list will therefore generally be freed.

While embodiments are described herein with respect to "snapshots", it is understood that techniques described herein may be applied to any context in which data is maintained in tree-like structures, COW is employed to copy nodes (e.g., data blocks or other subsets of data) from a first tree-like data structure to a second tree-like data structure, and the first tree-like data structure is deleted. Furthermore, while certain embodiments involve the use of logs, such as logs that store IO operations that take place following the creation of snapshots, embodiments that do not include logs are possible, as logs are only included to describe aspects of particular applications of the present solution.

Embodiments of the present disclosure constitute an improvement with respect to conventional industry practices, as they allow for delete operations to be performed on snapshots of logical storage systems with the use of significantly less processing resources than those required by conventional techniques. Using a list to track nodes that are copied (e.g., using COW techniques) from a first snapshot to a second snapshot allows for storage space of the first snapshot to be freed without analyzing every node of the first snapshot to determine whether storage space occupied by each node can be freed. Furthermore, embodiments of the present disclosure allow for COW techniques to be employed, thereby allowing for the benefits of these techniques to be achieved with respect to resource efficiency, while also allowing optimized delete operations to performed on snapshots that are copied using COW techniques. Accordingly, techniques described herein improve the functioning of computer systems by reducing congestion, preventing bottlenecks, avoiding system crashes, ensuring availability of processing and storage resources for other purposes, and the like. In some cases, embodiments of the present disclosure have been found to improve system performance, particularly with respect to usage of processing resources, by more than ten thousand percent as compared to conventional practices.

FIG. 1 depicts an example hierarchical structure of storage objects that represent a logical storage system (e.g., a virtual disk). The example depicted in FIG. 1 is merely one example of a logical storage system with which embodiments of the present disclosure may be implemented, and techniques described herein are not limited to virtual storage systems. For example, embodiments of the present disclosure may alternatively be implemented with physical storage systems.

A virtual machine (VM) 112 running on one of nodes 111 may perform I/O operations on a virtual disk that is stored as a hierarchical or composite object 100 in object store 116. Hypervisor 113 provides VM 112 access to the virtual disk by interfacing with an abstraction of a virtual storage area network (VSAN) through VSAN module 114 (e.g., by auto-mounting the top-level file system object corresponding to the virtual disk object). For example, VSAN module 114, by querying its local copy of an in-memory metadata database, is able to identify a particular file system object 105 (e.g., a virtual machine file system (VMFS) object in one embodiment) stored in VSAN that stores a descriptor file 110 for the virtual disk (e.g., a .vmdk file, etc.). It should be recognized that the file system object 105 may store a variety of other files consistent with its purpose, such as virtual machine configuration files (e.g., .vmx files in a vSphere environment, etc.) and the like when supporting a virtualization environment. In certain embodiments, each file system object may be configured to support only those virtual disks corresponding to a particular VM (e.g., a "per-VM" file system object).

Descriptor file 110 includes a reference to composite object 100 that is separately stored in object store 116 and conceptually represents the virtual disk (and thus may also be sometimes referenced herein as a logical disk object or virtual disk object). Composite object 100 stores metadata describing a storage organization or configuration for the virtual disk (sometimes referred to herein as a virtual disk "blueprint") that suits the storage requirements or service level agreements (SLAs) in a corresponding storage profile or policy (e.g., capacity, availability, IOPS, etc.) generated by an administrator when creating the virtual disk.

RAID configurations can be specified by blueprint to improve data reliability and availability. More generally, a storage object can be built from a hierarchy or tree of RAID nodes sometime referred to as RAID primitives. RAID1 (mirroring), RAID0 (striping), RAID5/6 (erasure coding) are well known primitives that can be used in the tree. Each of these nodes results in a transformation of the address space of the storage object. For example, RAID1 copies the address among its children and RAID0 splits the address space up in a round-robin fashion among its children without providing any replication. RAID5/6 does a combination of both, resulting in smaller sized components and some internal redundancy.

For example, composite object 100 includes a virtual disk blueprint 115 that describes a RAID1 configuration where two mirrored copies of the virtual disk (e.g., mirrors) are each further striped in a RAID0 configuration. Composite object 125 may thus contain references to a number of "leaf" or "component" objects 120x (e.g., logical components) corresponding to each stripe (e.g., data partition of the virtual disk) in each of the virtual disk mirrors. The metadata accessible by VSAN module 114 in the in-memory metadata database for each component object 120 (e.g., for each stripe) provides a mapping to or otherwise identifies a particular node 111x in the physical storage resources (e.g., magnetic disks 118, etc.) that actually store the stripe (as well as the location of the stripe within such physical resource). The local storage housed in or otherwise directly attached to the nodes 111 may include combinations of solid state drives (SSDs) 117 and/or magnetic or spinning disks 118. In certain embodiments, SSDs 117 serve as a read cache and/or write buffer in front of magnetic disks 118 to increase I/O performance.

Embodiments of the present disclosure may be used with the logical storage system depicted in FIG. 1 to perform an optimized delete operation on a snapshot of the logical storage system (e.g., described by file system object 105), as described below with respect to FIGS. 2-6.

Figure 2:
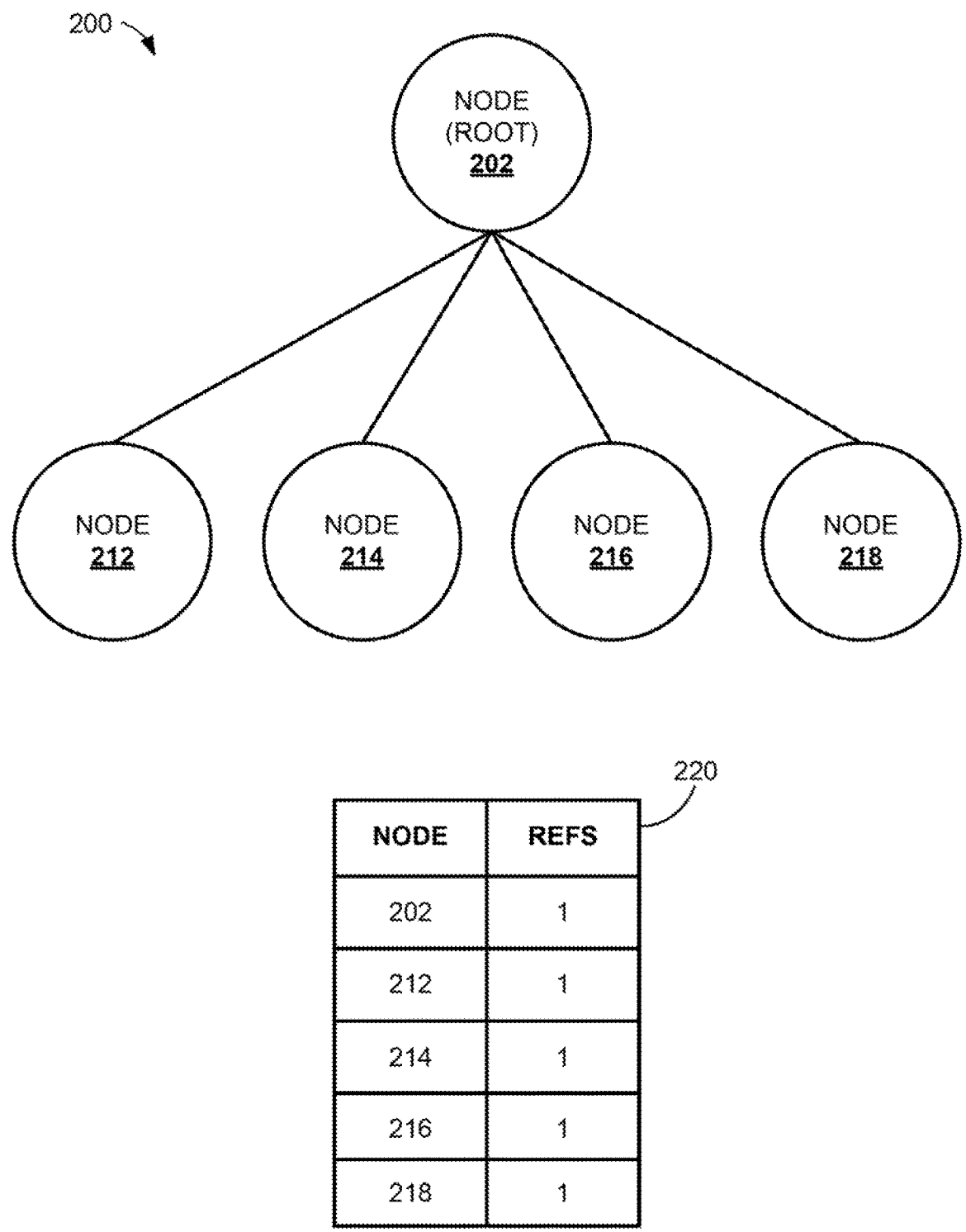
FIG. 2 depicts an example related to managing snapshots of a logical storage system.

FIG. 2 depicts an example 200 related to managing snapshots of a logical storage system, including nodes 202, 212, 214, 216, and 218 of a first snapshot and a data structure 220 for tracking reference counts of nodes. Each node may, for example, comprise a data block of the first snapshot.

As depicted, the first snapshot has a root node 202 and four child nodes 212, 214, 216, and 218. For example, the first snapshot may be a copy of the state of data of a logical storage system (e.g., the file system described by file system object 105 of FIG. 1) at the time the first snapshot was created. Data structure 220 comprises reference counts associated with each of the nodes in the first snapshot. For example, data structure 220 may be maintained by an administrative entity (e.g., VSAN module 114 of FIG. 1), and may store a number of references in association with each node (e.g., each of which may be identified in data structure 220 by an identifier, address, or the like). For example, because nodes 202, 212, 214, 216, and 218 are only referenced by the first snapshot, each is associated with a reference count of one in data structure 220.

Figure 3:
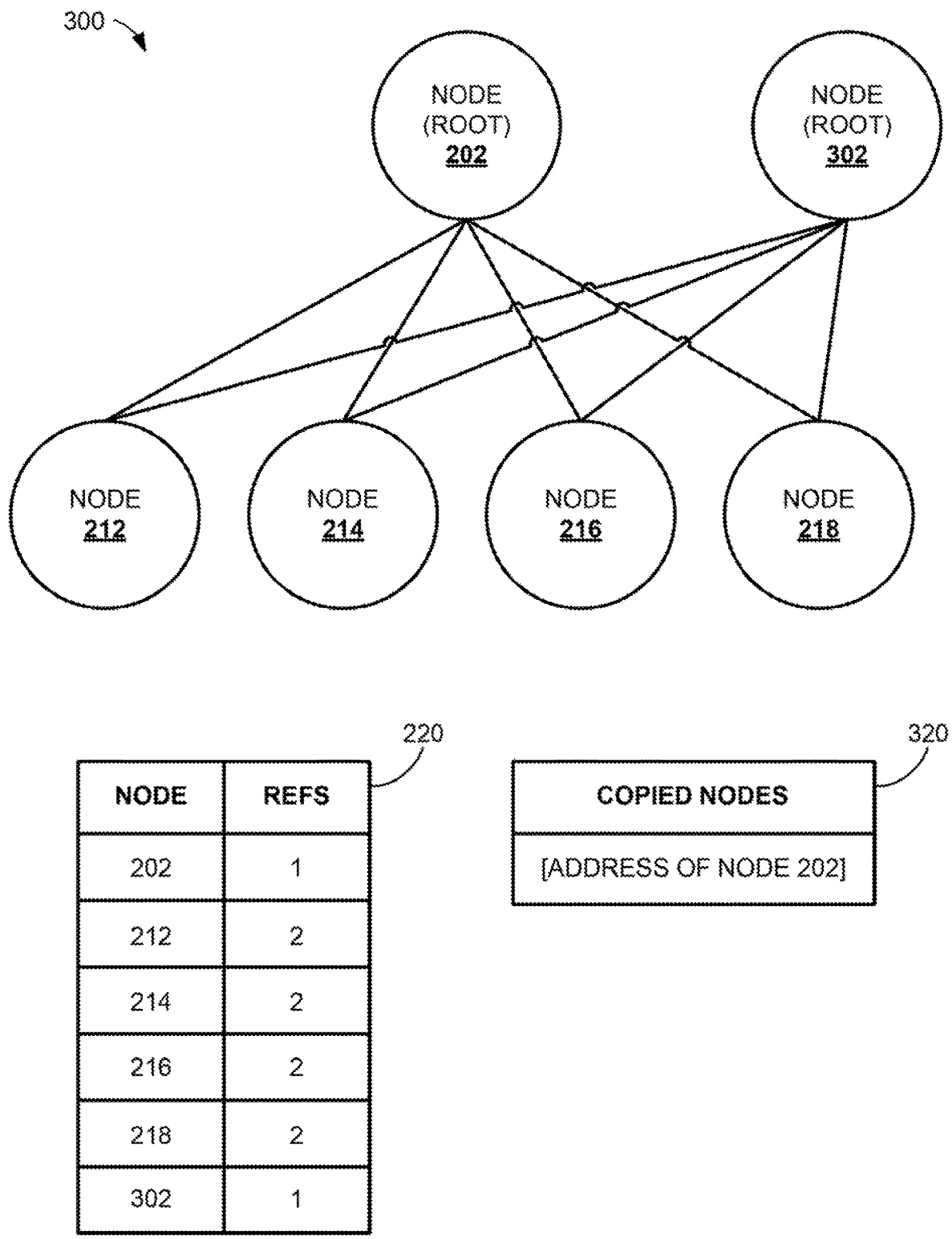
FIG. 3 depicts another example related to managing snapshots of a logical storage system.

FIG. 3 depicts another example 300 related to managing snapshots of a logical storage system, including nodes 202, 212, 214, 216, and 218 of the first snapshot and data structure 220 for tracking reference counts of nodes (e.g., all of which are described with respect to FIG. 2). Example 300 also includes node 302 of a second snapshot which may, for example, comprise a copy of node 202 of the first snapshot. Node 302 comprises references to nodes 212, 214, 216, and 218. For example, COW techniques may have been used to copy the first snapshot to the second snapshot, and each of nodes 212, 214, 216, and 218 may only be referenced from the second snapshot until each is modified, at which time each would be copied to the second snapshot according to COW techniques. Data structure 220 has been updated such that each of nodes 212, 214, 216, and 218 has a reference count of two (e.g., the reference count of each has been incremented by one because each of these nodes is referenced by both the first snapshot, from root node 202, and the second snapshot, from root node 302).

List 320 comprises a list of addresses of nodes that have been copied (e.g., from the first snapshot to the second snapshot). Because node 202 has been copied to the second snapshot to create node 302, the address of node 202 has been added to list 320. For example, the address of node 202 may comprise a location on a storage device at which node 202 is located. List 320 may be used to perform an optimized delete operation, as described below with respect to FIG. 5.

Figure 4:
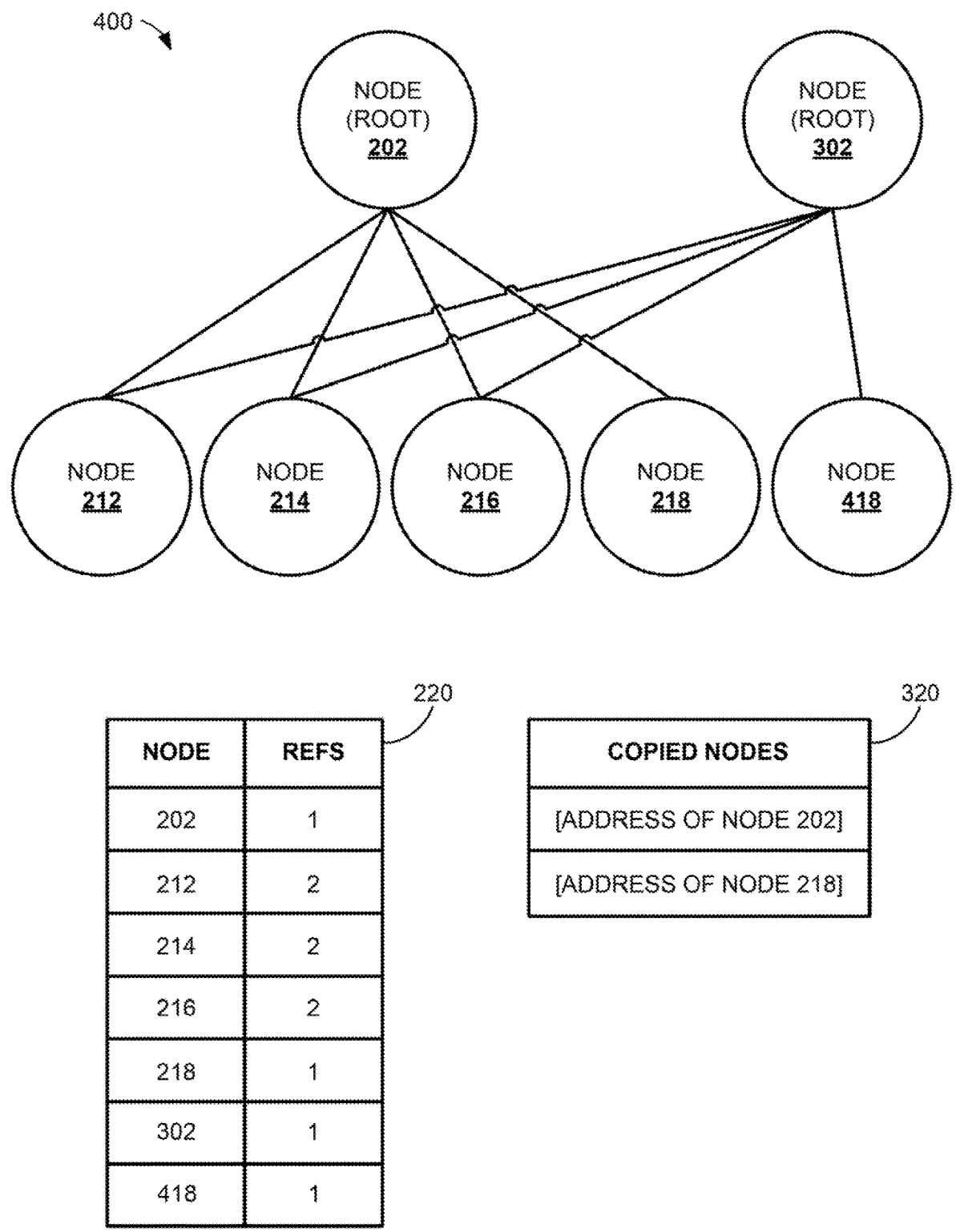
FIG. 4 depicts another example related to managing snapshots of a logical storage system.

FIG. 4 depicts another example 400 related to managing snapshots of a logical storage system, including nodes 202, 212, 214, 216, and 218 of the first snapshot, node 302 of the second snapshot, data structure 220 for tracking reference counts of nodes, and list 320 comprising the addresses of nodes that have been copied (e.g., all of which are described above with respect to FIGS. 1 and 2). Example 400 also includes node 418 of the second snapshot which may, for example, comprise a copy of node 218 of the first snapshot. For example, a COW operation may have been performed to copy node 218 to create node 418 when a write operation was performed on node 218 (e.g., which may be performed on the second snapshot by replaying a log of IO operations that took place in the logical storage system following the creation of the first snapshot, and that is stored in association with the first snapshot).

Data structure 220 has been updated to reflect that node 218 has a reference count of one (e.g., the reference count of node 218 has been decreased by one because it has been copied to the second snapshot to create node 418, and so the reference to node 218 from the second snapshot has been removed). Furthermore, node 418 has been added to data structure 220 with a reference count of one, since node 418 is now only referenced by the second snapshot.

List 320 has been updated to include the address of node 218. For example, because node 218 has been copied from the first snapshot to create node 418 of the second snapshot, the reference count of node 218 being accordingly decreased by one, the address of node 218 is added to list 320 for use in an optimized delete operation, which is described below with respect to FIG. 5.

Figure 5:
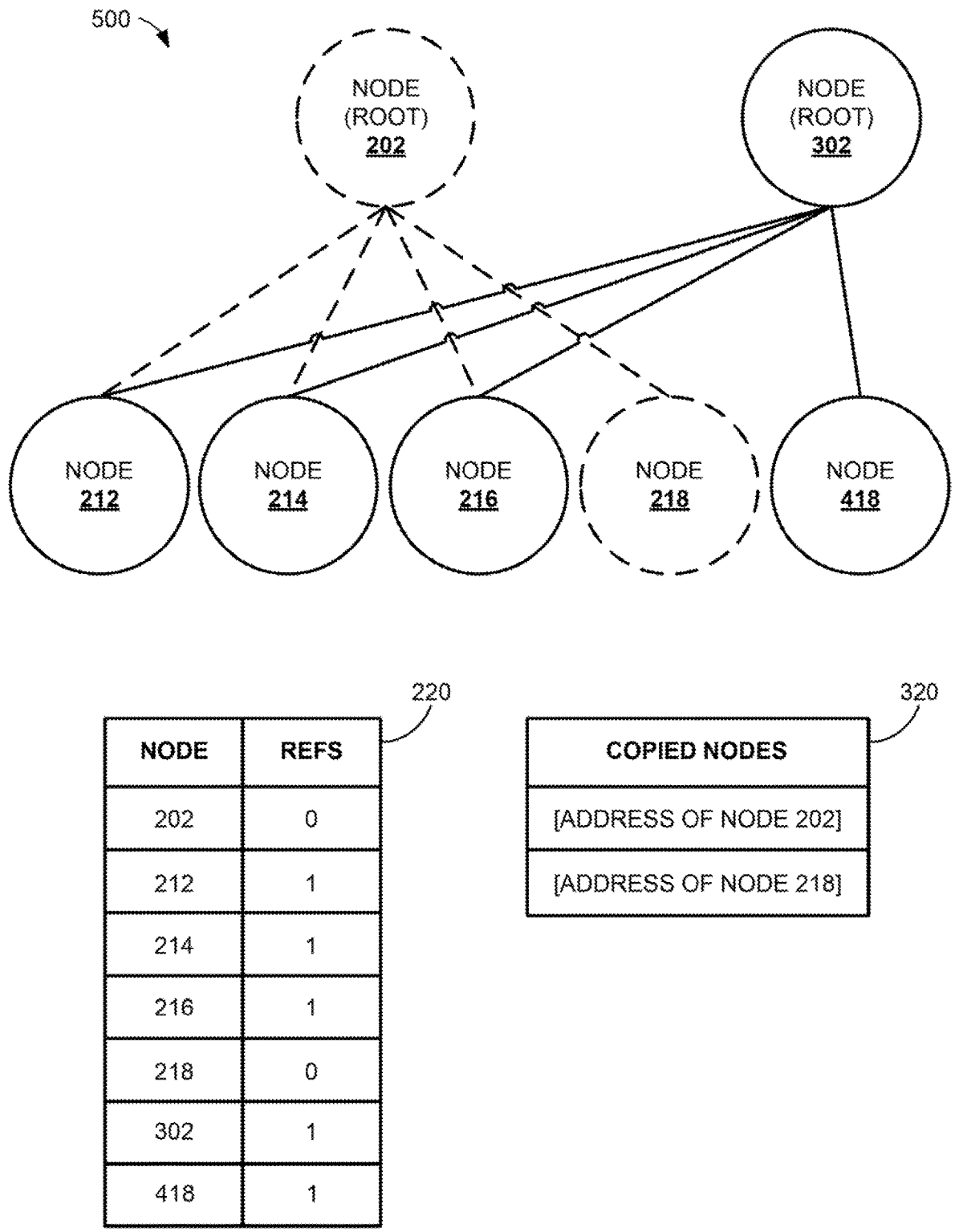
FIG. 5 depicts another example related to managing snapshots of a logical storage system.

FIG. 5 depicts another example 500 related to managing snapshots of a logical storage system, including nodes 202, 212, 214, 216, and 218 of the first snapshot, nodes 302 and 418 of the second snapshot, data structure 220 for tracking reference counts of nodes, and list 320 comprising the addresses of nodes that have been copied (e.g., all of which are described above with respect to FIGS. 1-4).

Example 500 illustrates an optimized delete operation that is performed on the first snapshot according to techniques described herein. For example, it may be determined that the first snapshot is to be deleted. This determination may be made by a user that initiates a delete operation or automatically based, for example, on the second snapshot reaching a consistency point (e.g., such that the current state of the data can be fully reconstructed using the second snapshot and a log stored in association with the second snapshot that stores IO operations that occurred in the logical storage system following the creation of the second snapshot).

The optimal delete operation involves traversing list 320 and, for each address in the list, decreasing by one the reference count associated in data structure 220 with the node that occupies the address. If a reference count associated with a node reaches zero, the storage space occupied by the node (e.g., at the address) is marked as free.

As shown in data structure 220, the reference counts of nodes 202 and 218 have both been decreased by one because the addresses of these nodes are included in list 320. Because the reference counts of nodes 202 and 218 have reached zero, the storage space occupied by the nodes is marked as free. This is illustrated in example 500 by dotted lines. For example, the nodes (and corresponding references) shown in dotted lines in example 500 are deleted (e.g., marked as free). Accordingly, the first snapshot is considered to be deleted, and the reference counts of nodes 212, 214, and 216 are reduced by one (e.g., because these nodes are now only referenced by the second snapshot)

The efficiency of a delete operation may be significantly improved by using list 320 to keep track of nodes that have been copied, and for which the reference count has been decreased, as the entirety of data structure 220 does not have to be traversed in order to perform the delete operation. While the examples depicted in FIGS. 2-5 involve a limited number of nodes, it is noted that embodiments of the present disclosure may increase performance more significantly when applied to snapshots comprising larger numbers of nodes.

It is noted that, while FIGS. 1-5 involve particular layouts of a logical storage system and snapshots thereof, embodiments of the present disclosure are not limited to the layouts depicted, and may be employed in a variety of different layouts. Furthermore, particular types of data structures (e.g., tables, arrays, lists, and the like) are included as examples, and other types of data structures may be employed without departing from the scope of the present disclosure.

Figure 6:
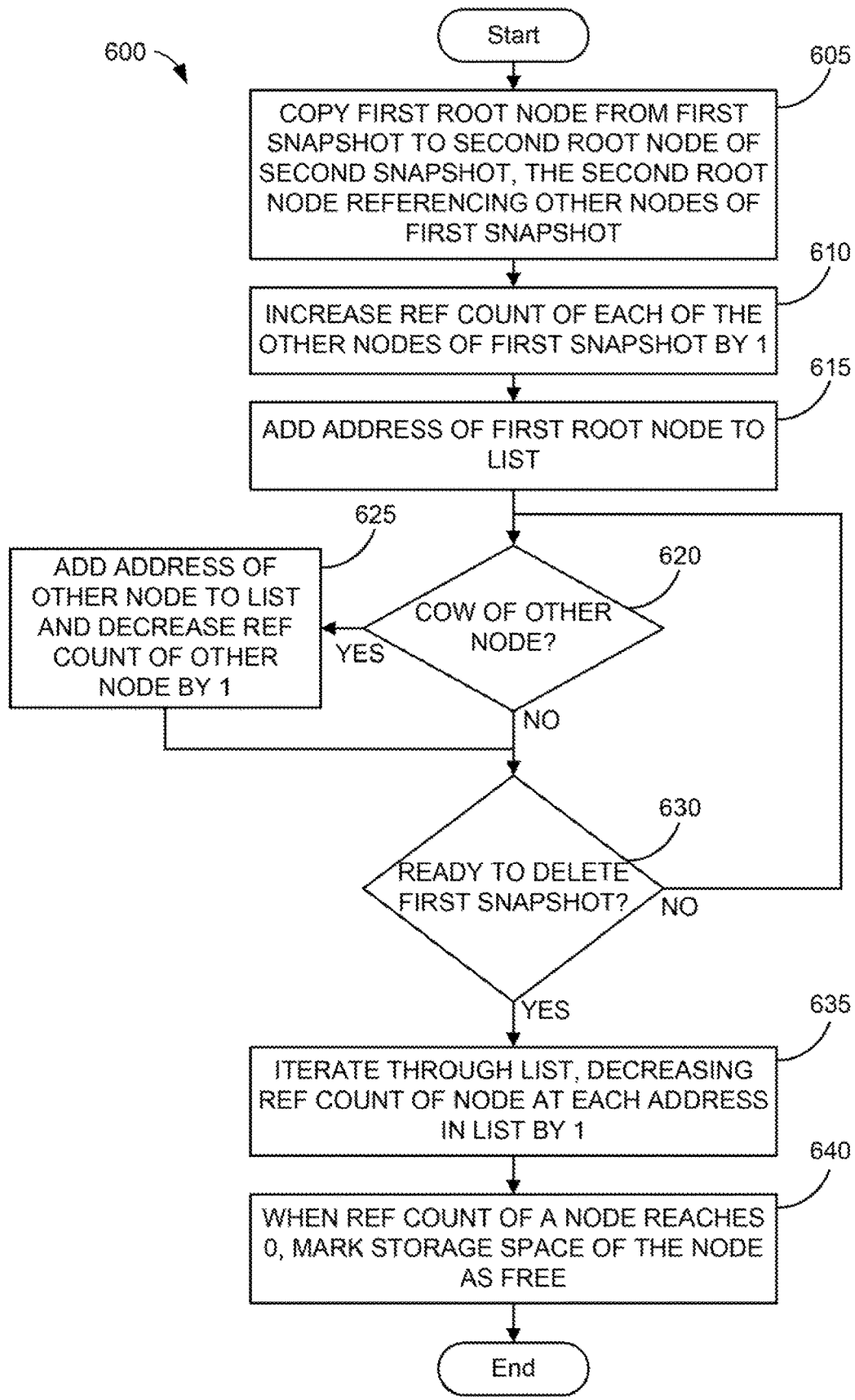
FIG. 6 is a flow diagram depicting example operations for managing snapshots of a logical storage system.

FIG. 6 depicts example operations 600 for managing snapshots of a logical storage system. For example, the operations 600 depicted in FIG. 6 may be performed after a first snapshot of a logical storage system is created (e.g., when a log associated with the first snapshot is nearly full), and may be performed by an administrative entity, such as an administrative server or the VSAN module 114 depicted in FIG. 1.

Operations begin at step 605, where a first root node is coped from a first snapshot to create a second root node of a second snapshot, the second root node referencing other nodes of the first snapshot. For example, the second snapshot may be created by using a COW technique to copy the first snapshot. Only the root node is copied from the first snapshot to the second snapshot, while all other nodes of the first snapshot are initially only referenced from the second snapshot unless and until a write operation is performed on each.

At step 610, a reference count of each of the other nodes of the first snapshot is increased by one. For example, a data structure (e.g., data structure 220 of FIGS. 2-5) may store a reference account in association with each node. Because each of the other nodes (e.g., all nodes except the root node) of the first snapshot is initially referenced by the second snapshot in addition the first snapshot, each will now have a reference count of two.

At step 615, the address of the first root node of the first snapshot is added to a list. For example, the list may store addresses of all nodes that have been copied between snapshots (e.g., using COW techniques between the first snapshot and the second snapshot). Because the first root node of the first snapshot has been copied to the second snapshot, the address of the first root node is added to the list.

At step 620, it is determined whether a COW operation has been performed to copy one of the other nodes from the first snapshot to the second snapshot. If a COW operation has not yet been performed, operation continue at step 630, where it is determined whether the first snapshot is ready to be deleted (e.g., based on whether the second snapshot has reached a consistency point such that the state of the data of the logical storage system may be completely reconstructed based on the second snapshot and a log associated with the second snapshot). If the first snapshot is not yet ready to be deleted at step 630, operations return to step 620, where it is determined whether a COW operation has been performed. Otherwise, if the first snapshot is ready to be deleted, operations continue at step 635, which is described below.

If a COW operation has been performed at step 620 to copy one of the other nodes to the second snapshot, operations continue at step 625. At step 625, an address of the other node is added to the list and the reference count associated with the other node in the data structure is decreased by one (e.g., to reflect the fact the other node is no longer referenced by the second snapshot). Operations then continue to step 630, where it is determined whether the first snapshot is ready to be deleted. Again, if the first snapshot is not yet ready to be deleted, operations return to step 620. Otherwise, if the first snapshot is ready to be deleted (e.g., a delete operation has been initiated on the first snapshot either by a user or automatically, such as based on a determination that the second snapshot has reached a consistency point), operations continue at step 635.

At step 635, the list is iterated through, and the reference count associated in the data structure with the node that occupies each address in the list is decreased by one. For example, the list may include the addresses of the first root node and each other node that has been copied from the first snapshot to the second snapshot. Decreasing the reference count associated with each of these nodes by one will likely result in a reference count of zero for each, as each of these nodes is currently only referenced by the first snapshot.

At step 640, the storage space occupied by each node with an associated reference count of zero is marked as free so that the storage space may be used for other purposes. This amounts to a deletion of the first snapshot, as only the nodes that are still referenced by the second snapshot remain. As such, the reference counts of nodes that are no longer referenced by the now-deleted first snapshot are decreased by one.

Techniques described herein allow for an optimized delete operation to be performed on a snapshot of a logical storage system when COW techniques are employed, even if all nodes from the snapshot have not yet been copied to a new snapshot (e.g., if not all nodes have been modified since the new snapshot was created). As such, embodiments of the present disclosure allow for the benefits of COW techniques (e.g., efficient usage of storage and processing resources) to be achieved while also allowing for efficient delete operations to be performed as needed.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be implemented as useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, a Solid State Disk (SSD), network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims.

What is claimed is:

1. A method for improved management of snapshots of a file system, comprising:
    copying a first root node of a first snapshot to create a second root node of a second snapshot, wherein the second root node of the second snapshot comprises references to other first nodes of the first snapshot;
    increasing a reference count associated with each of the other first nodes of the first snapshot by one;
    adding a storage address of the first root node of the first snapshot to a list;
    each time that a copy on write (COW) operation is performed to copy a particular node of the other first nodes of the first snapshot to the second snapshot:
        adding a storage address of the particular node to the list; and
        decreasing the reference count associated with the particular node by one;
    performing a delete operation on the first snapshot by iterating through the list and, for each storage address in the list, performing the following operations:
        decreasing the reference count associated with the node corresponding to the storage address by one; and
        if the reference count associated with the node reaches zero, marking storage space at the storage address as free.

2. The method of claim 1, wherein the first snapshot and the second snapshot comprise B-trees.

3. The method of claim 1, wherein the reference count associated with each node of the other first nodes is maintained separately from the node.

4. The method of claim 1, further comprising:
    writing IO operations of the file system to a log associated with the first snapshot, wherein the first root node of the first snapshot is copied to create the second root node of the second snapshot upon determining that the log is approaching a capacity.

5. The method of claim 4, wherein determining that the log is approaching a capacity comprises:
    comparing a size of the log to a threshold; and
    determining that the size of the log has reached or exceeded the threshold.

6. The method of claim 4, further comprising: replaying the log to perform updates to the second snapshot, wherein COW operations are performed to copy particular nodes of the other first nodes of the first snapshot to the second snapshot based upon the updates.

7. The method of claim 6, wherein the delete operation is performed upon determining that the second snapshot has been updated based on all IO operations in the log.

8. A non-transitory computer-readable storage medium comprising instructions that, when executed in a computing device, perform a method for improved management of snapshots of a file system, the method comprising:
    copying a first root node of a first snapshot to create a second root node of a second snapshot, wherein the second root node of the second snapshot comprises references to other first nodes of the first snapshot;
    increasing a reference count associated with each of the other first nodes of the first snapshot by one;
    adding a storage address of the first root node of the first snapshot to a list;
    each time that a copy on write (COW) operation is performed to copy a particular node of the other first nodes of the first snapshot to the second snapshot:
        adding a storage address of the particular node to the list; and
        decreasing the reference count associated with the particular node by one;
    performing a delete operation on the first snapshot by iterating through the list and, for each storage address in the list, performing the following operations:
        decreasing the reference count associated with the node corresponding to the storage address by one; and
        if the reference count associated with the node reaches zero, marking storage space at the storage address as free.

9. The non-transitory computer-readable storage medium of claim 8, wherein the first snapshot and the second snapshot comprise B-trees.

10. The non-transitory computer-readable storage medium of claim 8, wherein the reference count associated with each node of the other first nodes is maintained separately from the node.

11. The non-transitory computer-readable storage medium of claim 8, wherein the method further comprises:
    writing TO operations of the file system to a log associated with the first snapshot, wherein the first root node of the first snapshot is copied to create the second root node of the second snapshot upon determining that the log is approaching a capacity.

12. The non-transitory computer-readable storage medium of claim 11, wherein determining that the log is approaching a capacity comprises:
    comparing a size of the log to a threshold; and
    determining that the size of the log has reached or exceeded the threshold.

13. The non-transitory computer-readable storage medium of claim 11, wherein the method further comprises: replaying the log to perform updates to the second snapshot, wherein COW operations are performed to copy particular nodes of the other first nodes of the first snapshot to the second snapshot based upon the updates.

14. The non-transitory computer-readable storage medium of claim 13, wherein the delete operation is performed upon determining that the second snapshot has been updated based on all TO operations in the log.

15. A computer system for improved management of snapshots of a file system, the computer system comprising:

a storage device;

a processor (CPU) configured to perform a method for improved management of snapshots of a file system, the method comprising:

copying a first root node of a first snapshot to create a second root node of a second snapshot, wherein the second root node of the second snapshot comprises references to other first nodes of the first snapshot;

increasing a reference count associated with each of the other first nodes of the first snapshot by one;

adding a storage address of the first root node of the first snapshot to a list;

each time that a copy on write (COW) operation is performed to copy a particular node of the other first nodes of the first snapshot to the second snapshot:

adding a storage address of the particular node to the list; and decreasing the reference count associated with the particular node by one;

performing a delete operation on the first snapshot by iterating through the list and, for each storage address in the list, performing the following operations:

decreasing the reference count associated with the node corresponding to the storage address by one; and if the reference count associated with the node reaches zero, marking storage space at the storage address as free.

16. The computer system of claim 15, wherein the first snapshot and the second snapshot comprise B-trees.

17. The computer system of claim 15, wherein the reference count associated with each node of the other first nodes is maintained separately from the node.

18. The computer system of claim 15, wherein the method further comprises:

writing IO operations of the file system to a log associated with the first snapshot, wherein the first root node of the first snapshot is copied to create the second root node of the second snapshot upon determining that the log is approaching a capacity.

19. The computer system of claim 18, wherein determining that the log is approaching a capacity comprises:

comparing a size of the log to a threshold; and determining that the size of the log has reached or exceeded the threshold.

20. The computer system of claim 18, wherein the method further comprises:

replaying the log to perform updates to the second snapshot, wherein COW operations are performed to copy particular nodes of the other first nodes of the first snapshot to the second snapshot based upon the updates.

21. The computer system of claim 20, wherein the delete operation is performed upon determining that the second snapshot has been updated based on all IO operations in the log.

* * * * *